United States Patent [19]
Schudel

[11] Patent Number: 5,811,700
[45] Date of Patent: Sep. 22, 1998

[54] ETCHED SUPPORT POST FOR PRECISE AXIAL ALIGNMENT BETWEEN OPPOSING STRUCTURES

[75] Inventor: Dale F. Schudel, Ayutthaya, Thailand

[73] Assignee: K. R. Precision Public Company Limited, Ayutthaya, Thailand

[21] Appl. No.: 625,913

[22] Filed: Apr. 1, 1996

Related U.S. Application Data

[63] Continuation-in-part of Ser. No. 431,971, May 1, 1995, Pat. No. 5,574,234.

[51] Int. Cl.$^6$ .................................................. G01N 19/00
[52] U.S. Cl. ............................................ 73/865.9; 73/760
[58] Field of Search ................................. 73/760, 865.9; 33/533; 360/104, 109, 31

[56] References Cited

U.S. PATENT DOCUMENTS

| | | | |
|---|---|---|---|
| 4,795,286 | 1/1989 | Shimoishi et al. | 401/209 |
| 4,842,433 | 6/1989 | Otsuka | 401/209 |
| 5,079,660 | 1/1992 | Yummura et al. | 360/104 |
| 5,495,375 | 2/1996 | Baasch et al. | 360/106 |
| 5,574,234 | 11/1996 | Schudel | 73/865.9 |

Primary Examiner—Max H. Noori
Attorney, Agent, or Firm—Antonio R. Durando

[57] ABSTRACT

A coupling device for ensuring a precise alignment between a disk-drive suspension and a static-attitude testing tool along a predetermined axis. The device consists of the combination of a support post or ridge etched in relief precisely along the longitudinal axis of a disk-drive suspension, or a spherical-radius post protruding through an etched relief, and a compressive mechanism in a static-attitude testing tool adapted to provide a compressive force in a direction coincident with the main axis of the support post in the suspension. A conventional tooling hole is provided at a predetermined location on the suspension, typically along its longitudinal axis, to enable alignment between the testing tool and the suspension. As the tool's compressive mechanism begins pushing against the support post to impart a load, the point of contact between the two is determined by the fixed axial position of the support post and remains fixed even if the testing tool and the suspension are lightly misaligned, thereby causing the force exerted by the compressive mechanism to be transferred to the suspension in perfect alignment with its longitudinal axis, as intended.

23 Claims, 8 Drawing Sheets

ETCHED SUPPORT POST FOR PRECISE AXIAL ALIGNMENT BETWEEN OPPOSING STRUCTURES

RELATED APPLICATIONS

This is a continuation-in-part application of commonly-assigned U.S. Ser. No. 08/431,971, filed on May 1, 1995, by the same inventor, which is currently patented to U.S. Pat. No. 5,574,234.

BACKGROUND OF THE INVENTION

1. Field of the Invention

This invention is related in general to apparatus for aligning two working structures along a desired alignment axis. In particular, it consists of a support post etched or otherwise formed in relief in the suspension assembly of a magnetic recording head for precise alignment with a static-attitude measuring device during the suspension's manufacturing process.

2. Description of the Related Art

The magnetic recording head of a rigid disk drive operates by flying in very close proximity over the surface of the magnetic disk, thereby accurately reading and writing data thereon. While the magnetic recording head, referred herein as the "slider," is flying disposed substantially in parallel over the disk during operation, it must be able to adjust its attitude to conform to magnetic-disk surface imperfections and dynamic displacements, such as surface vibrations generated by the rotating movement. Therefore, the torsional characteristics of the suspension supporting the slider are critical to the proper functioning of the apparatus and must be maintained within prescribed design specifications to prevent contact with the disk surface and avoid the disabling consequences that normally result therefrom.

Figure 1:
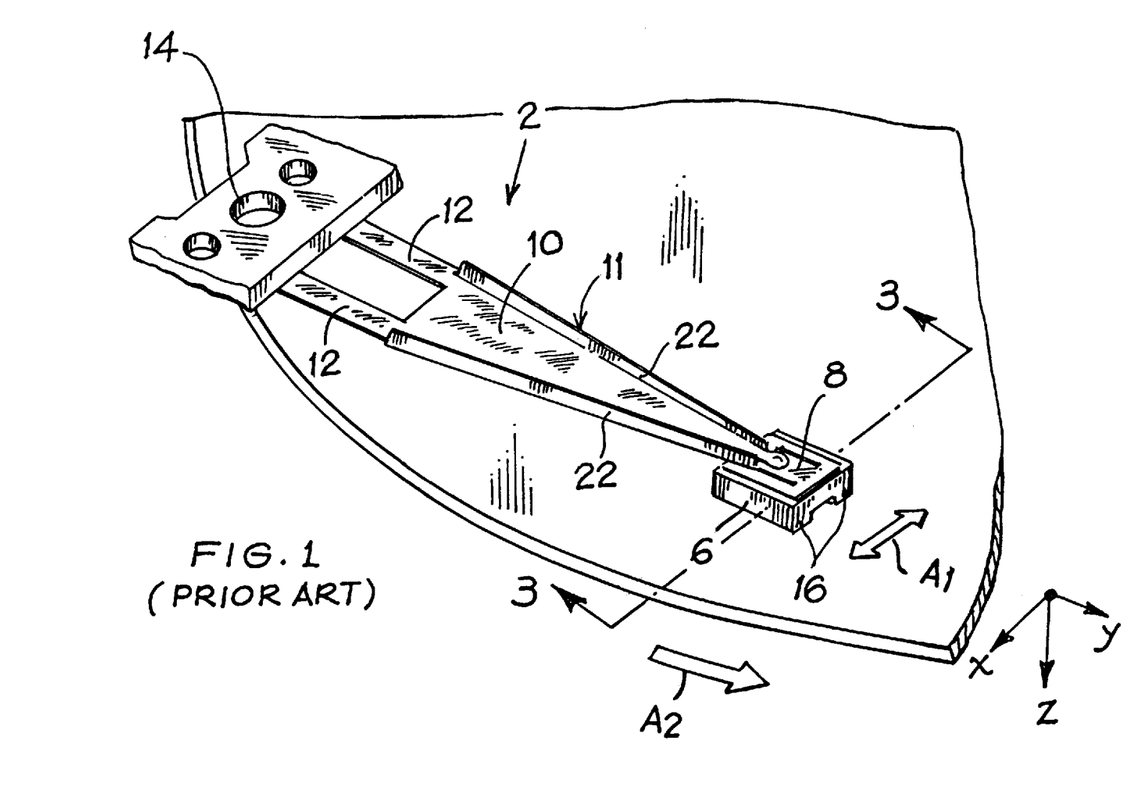
FIG. 1 is a simplified schematic representation of a conventional head gimbal assembly operating on a magnetic disk.

For illustration, FIG. 1 shows in perspective view a conventional magnetic head gimbal assembly 2 (HGA) positioned over a magnetic disk 4. The head gimbal assembly 2 consists of a slider 6 mounted on a gimbal 8 which is either integral with or rigidly connected to a load beam 10 that comprises a pre-load region 12, providing the required force on the slider to maintain the slider's constant flying height, and formed rails 22, providing rigidity to the assembly. The combined gimbal 8, mount 14 and load beam 10, which constitute the suspension 11, support the slider portion of the head gimbal assembly. The suspension is in turn attached to a driving mechanism (not shown) by means of the screw or swage mount 14. In operation, the head gimbal assembly 2 is moved by the driving mechanism along the radius of the magnetic disk 4 (arrows A1) so that the slider 6 may be placed rapidly over the appropriate read/write tracks in circumferential direction with respect thereto as the disk is rotated in the direction of arrow A2.

Figure 2:
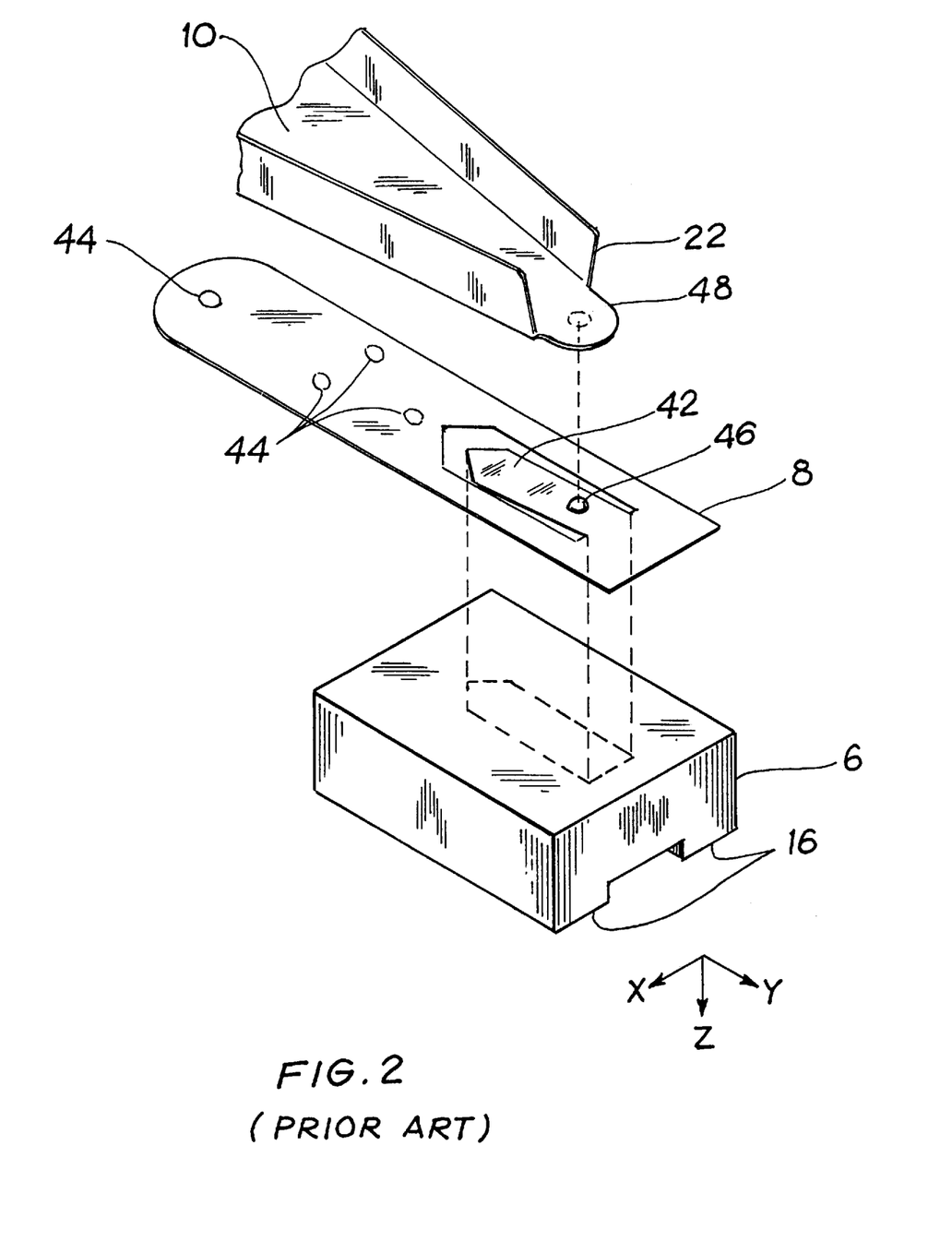
FIG. 2 is an exploded perspective view of the various components of conventional prior-art magnetic-head supporting apparatus.
Figure 3:
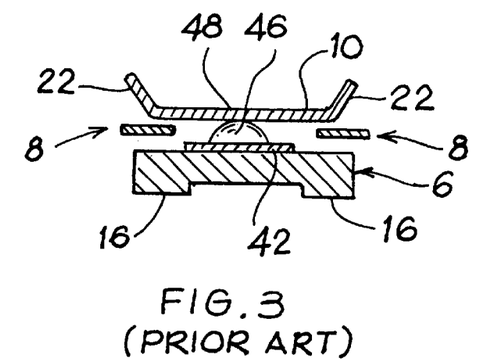
FIG. 3 is partial cross-section of FIG. 1, taken from line 3—3 in that figure, to illustrate the coupling between the slider and load beam of conventional apparatus.

For ease of description, the radial, tangential and vertical directions with respect to the surface of disk 4 are referenced in the figures by x, y and z coordinates, respectively. Thus, the magnetic head slider 6 is supported by the gimbal 8 for controlling pitching and rolling movements as the slider's position changes in the radial (x axis) and circumferential (y axis) directions of the magnetic disk 4. FIG. 2 illustrates in exploded perspective view the essential portions of conventional prior-art magnetic-head supporting apparatus. As also shown in the partial cross-section of FIG. 3, the slider 6, to which a magnetic head is mounted (not shown), is attached to a gimbal tongue 42 of the gimbal 8, while the load beam 10 is attached to the outer frame of the gimbal 8 by means of multiple laser welds at 44. The tongue 42 has a preformed angle and twist and comprises a convex dimple 46 adapted to pivot freely against a flat region 48 in the load beam 10. Thus, as the magnetic head flies during operation, the dimple 46 pivots freely at the point of contact in the load beam's region 48 in the pitch and roll moments of rotation. When the magnetic disk is rotated, an air bearing is created by the air flowing between the surface of the disk and the rails 16 in the magnetic head slider 6, and the torsional characteristics (roll) of the suspension 11 must be such that the slider maintains its dynamic attitude through surface imperfections and vibrations of the rotating disk.

As magnetic recording technologies evolve, progressive miniaturization of head gimbal assembly components creates critical challenges. One is the tolerance control on the static attitude parameters of the suspension 11 as the slider size is reduced. As the slider 6 becomes smaller, the narrower width between its rails produces smaller differential pressure profiles that result in head gimbal assemblies having flying roll characteristics closely correlated to their static roll attributes. Accordingly, flying attitude characteristics may be predicted well by testing the static attitude of the suspensions under controlled conditions.

Figure 4:
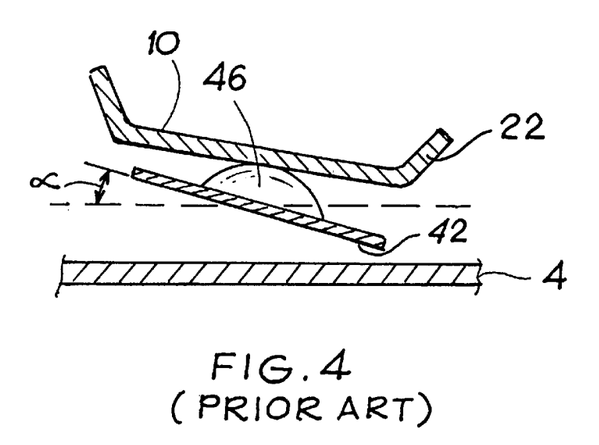
FIG. 4 is a simplified view of FIG. 3 illustrating the pivoting motion of the tongue of a conventional gimbal with respect to the magnetic disk.

Thus, in order to ensure the desired dynamic performance of the suspension (pitch, roll and resonance characteristics), each component of the assembly is manufactured according to specific design specifications and is bench tested for predetermined static parameters. The static attitude of each suspension is measured and compared to allowable tolerances. The suspension is subjected to a predetermined load at a point along its longitudinal axis, simulating the loaded position of the suspension in the disk drive, and appropriate static measurements are made. In practice, as illustrated schematically in FIG. 4, each measurement consists simply of an angle with respect to a reference datum point parallel to the disk surface, such as the static roll angle $\alpha$ between the plane of the gimbal tongue 42 and a plane D parallel to the surface of the disk 4. If the measurement is outside the target tolerance for the suspension, the suspension is either discarded or adjusted by bending the load beams in the appropriate direction relative to the desired zero datum reference to modify the static characteristics of the suspension.

Since the components of the suspension consist of very thin stainless-steel structures with extremely low pitch and roll stiffnesses (typically with spring rates in the order of 2 to 10 micro-Joules/degree), a perfect alignment of the axis of the suspension with the measurement device is essential to avoid the introduction of artificial lateral distortions during measurement. If the point of contact of the testing tool (that is, the point where the tool pushes against the assembly to impart a load) does not coincide with the suspension's longitudinal axis, a torsional force is introduced that distorts the results. Accordingly, it is very important that such a point of contact with the tool's probe lie on the longitudinal axis of the suspension. This is often difficult to achieve even with very precise instrumentation because of the several components whose cumulative tolerances contribute to the final alignment.

Therefore, there exists a need for an improved method of aligning a testing tool with a disk-drive suspension for imparting a test load during the manufacturing process. My copending application Ser. No. 08/431,971 discloses a floating-ball device that ensures perfect alignment between the suspension and the testing tool; the present invention discloses yet another, simpler coupling device for achieving the same goal. Although both applications address the same issue, one uses sophisticated precision tooling with self-aligning capabilities, while the other enhances the suspension itself, thus eliminating the need for precision, self-aligning tooling.

BRIEF SUMMARY OF THE INVENTION

A general objective of this invention is a mechanism that ensures the near-perfect alignment along a predetermined alignment axis of two working components being subjected to a pressure contact.

A more specific and primary goal of the invention is a mechanism and related method of use for ensuring the near-perfect alignment of a load-imparting tool with the longitudinal axis of a disk-drive suspension for attitude testing during the process of manufacture of the assembly.

Another goal is a mechanism that is suitable for automated utilization in conventional testing equipment.

Finally, an objective of this invention is a device that can be manufactured in an economical and commercially viable manner to produce savings with respect to prior-art HGA testing apparatus and methods.

Therefore, according to these and other objectives, the present invention consists of the combination of a support post etched in relief precisely along the longitudinal axis of a disk-drive suspension and a compressive mechanism in a static-attitude testing tool adapted to provide a compressive force in a direction coincident with the main axis of the support post in the suspension. A conventional tooling hole is provided at a predetermined location on the suspension, typically along its longitudinal axis, enabling manufacturing and alignment of the gimbal to the load beam while also providing a central-axis datum point location. As the tool's compressive mechanism begins pushing against the support post to impart a load, the point of contact between the two is determined by the fixed axial position of the support post and remains fixed even if the testing tool and the suspension are slightly misaligned, thereby causing the force exerted by the compressive mechanism to be transferred to the suspension in precise alignment with its longitudinal axis, as intended.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

DESCRIPTION OF THE PREFERRED EMBODIMENT OF THE INVENTION

The main inventive concept of this disclosure consists of the combination of a support structure on one component and a compressive mechanism on another component to provide a simple means for ensuring very precise alignment between the two components, as required to transmit a force between each other along a predetermined line of action. The principle of the invention is described with reference to a static-attitude test tool for imparting a load to a disk-drive suspension under fixed test conditions, but the mechanism of the invention has much broader application and can be utilized as a coupling device in any situation where two separate components need to be aligned precisely along a predetermined point of reference.

Figure 5:
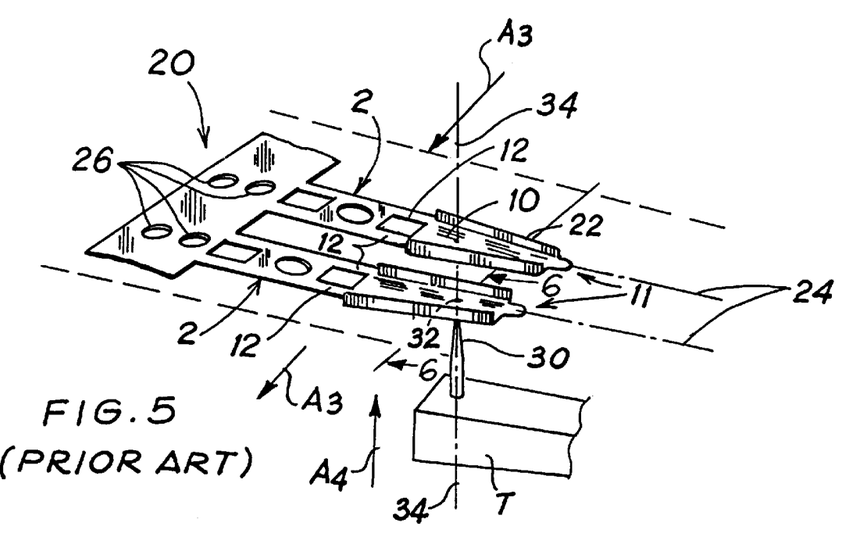
FIG. 5 is a schematic illustration of a test tool operating on a fret of suspensions by sequentially imparting a predetermined load on a precise point of contact along the longitudinal axis of each suspension.

Referring to the drawings, wherein like parts are designated throughout with like numerals and symbols, FIG. 5 illustrates in schematic perspective view a typical test tool T operating sequentially on a fret 20 of suspensions 11 produced by conventional photo-etching, forming and laser-welding processes. The tool T operates on each suspension 11 sequentially as the fret 20 moves along the assembly line in a direction such as indicated by arrows A3 and periodically matches the position of each suspension 11 to the tool T. Each suspension consists of a metal portion that is formed from a very thin (in the order of 0.05 mm) metal sheet of homogeneous physical structure, thereby producing suspensions and load beams expected to have uniform torsional characteristics. The suspensions are strategically punched or etched to produce desired dynamic responses to forces that cause rotational or linear displacements, and rigid structural rails 22 are typically formed in the suspension to provide stiffness according to predetermined design criteria. The pre-load region 12 is normally bent to provide a built-in angle toward the disk surface before engagement with the disk 4 (a 10-degree bend is typical). When in use, the suspension is typically displaced to a condition approaching zero-degree deflection. This deflection creates a force against the slider 6 of the assembly that keeps the slider at the desired nominal flying height during operation (FIG. 1).

As mentioned, one critical test during the process of manufacture concerns the attitude of the suspension 11 under loaded conditions. For that purpose, the testing tool T is adapted to move along an axis 34 orthogonal to the plane of the suspension 11 and press against a predetermined contact or datum point 32 lying both on axis 34 and on the longitudinal axis 24 of the suspension 11 to impart a test load (typically between 3 and 7 grams) in a direction passing though the datum point 32. This test simulates the working conditions present when the slider 6 is floating over the surface of the disk 4 (see FIG. 1). As well understood by those skilled in the art, tooling holes 26 are provided in the fret 20 for alignment of the suspension 11 during testing and various other phases of production. During this testing phase, the tip 28 of the probe 30 in the test tool T is moved upward (arrow A4) along the axis 34 to exert upward pressure against the suspension 11 through the contact point 32, as illustrated in the side view of FIG. 6. The tool T is aligned with the desired contact point 32 on the longitudinal axis 24 by centering the tip 28 on the axis 34 (which is perpendicular to axis 24). If alignment of the suspension 11 is not nearly perfect, such as may occur as a result of tolerance stack-ups, calibration errors, and general misalignment, the tip 28 may miss the situs of the desired datum point 32 causing contact to occur at a point likely to be offset from the longitudinal axis 24, as illustrated in FIG. 7. This results in a torsional moment being imparted to the suspension 11, which in turn affects the static attitude measurements for the suspension under load.

Figure 6:
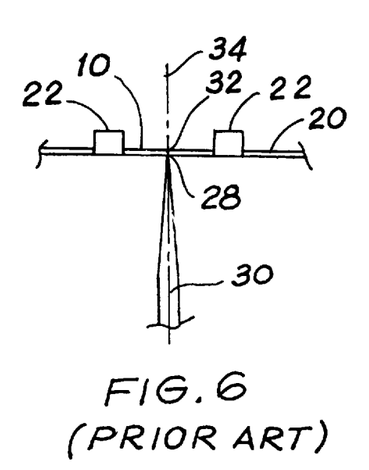
FIG. 6 is a front view of the test-tool probe of FIG. 5, taken along line 6—6, illustrating a precise contact between the tool tip and the intended datum point on the assembly.
Figure 7:
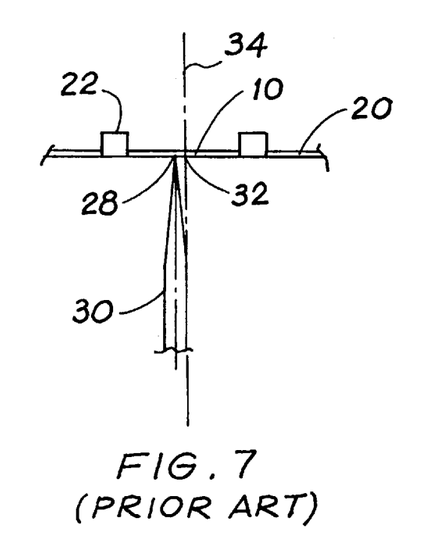
FIG. 7 is a front view of the test-tool probe of FIG. 6 illustrating a lateral offset between the contact point of the tool tip and the intended datum point on the assembly.

It is noted that the tool T is shown in FIGS. 5–7 operating in a vertical direction pushing upward against a downward-disposed suspension assembly. In practice, the effect of gravity is negligible during testing and working conditions of suspension assemblies, which are normally adapted to operate both on the top and bottom surfaces of hard disks. Therefore, the illustrations of these figures would be equivalently valid if turned upside down.

Figure 8:
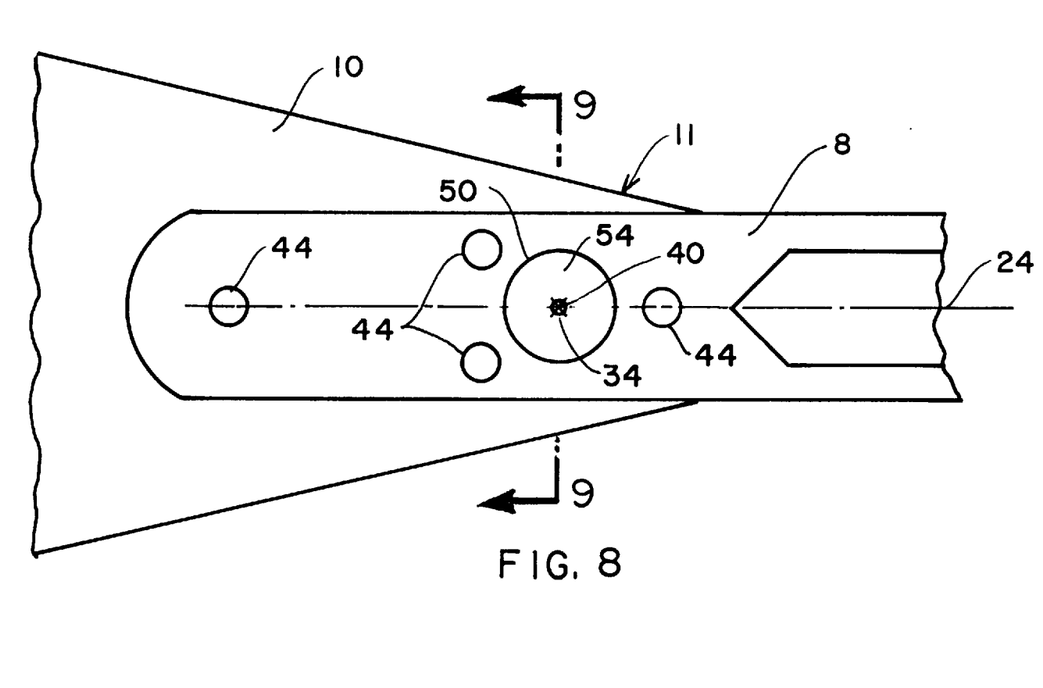
FIG. 8 is a bottom view of a portion of a conventional disk-drive suspension incorporating the support structure of the present invention in the form of a post etched in relief in the underside of the gimbal.

As illustrated in the schematic view of FIG. 8, which shows a portion of the underside of the suspension 11, the present invention consists in part of a support structure, such as a post 40 or a ridge, formed in relief in the gimbal 8 of the suspension in perfect alignment with the longitudinal axis 24 of the suspension. In addition, the post 40 is positioned such that its main axis is coincident with the axis 34 of the intended direction of application of the compressive force. As better seen in the cross-sectional view of FIG. 9, which is a view corresponding to line 9—9 in FIG. 8, the post 40 may be obtained by accurately removing material from portions of the gimbal 8 surrounding the post 40, thereby creating an annular cavity area 54 from which the post 40 projects upwards (as shown in FIG. 8) in perfect vertical alignment with the axis 24 of the suspension assembly. The cavity 54 is preferably produced by optical and chemical etching means which are extremely precise and, therefore, make it possible to accurately position the post 40. Another component of the invention consists of a flat tip in the probe 30 in the test tool T, which is adapted to exert a compressive force against the post 40 in a direction perpendicular to the longitudinal axis 24 of the suspension (and parallel to axis 34). As mentioned above, the post 40 is provided along the longitudinal axis 24 of each suspension during manufacture to establish the desired effective point of contact with the probe 30 of the test tool T. These critical components of the invention are illustrated schematically in FIG. 10, where the post 40 in the gimbal 8 is shown facing down and the tip 56 of the probe 30 is shown operating upward. The top surface of the tip 56 comprises a flat compression face 58 disposed perpendicularly to the axis 34 (see FIG. 5), which is orthogonal to the plane of the suspension assembly and collinear with the desired direction of the compressive force F produced by the test tool 30 (which, of course, must also pass through the post 40). The relative sizes of the cavity 54 and of the tip 56 are chosen such that the only points of contact between the tool 30 and the gimbal 8 will be along the post 40 so long as the tool operates within expected tolerances in deviating from perfect alignment. Thus, for example, if it were known that the tip 56 might deviate from perfect coaxial alignment with the post 40 by a maximum of 0.1 mm during normal testing operation, the etched area of the cavity 54 would be designed to be at least that much larger than the width of the compression face 58.

Because of the relief structure of the post 40, it is clear that the compressive force F exerted by the testing tool T (shown as pointing upward in FIG. 10) is applied to the gimbal 8 (and therefore also to the suspension 11) only through the post 40, thereby ensuring that the force is exerted along axis 34 even when the probe 30 of the tool T is misaligned. In such a case, as illustrated in phantom line in FIG. 10, the compressive face 58 of the tip 56 will be the only point of contact between the testing tool and the gimbal; therefore, the force exerted will necessarily pass through the post 40 which, by design, is positioned along the longitudinal axis 24 of the suspension. Thus, the compressive mechanism of the invention ensures perfect alignment with the longitudinal axis 24 during static-attitude testing.

Figure 10:
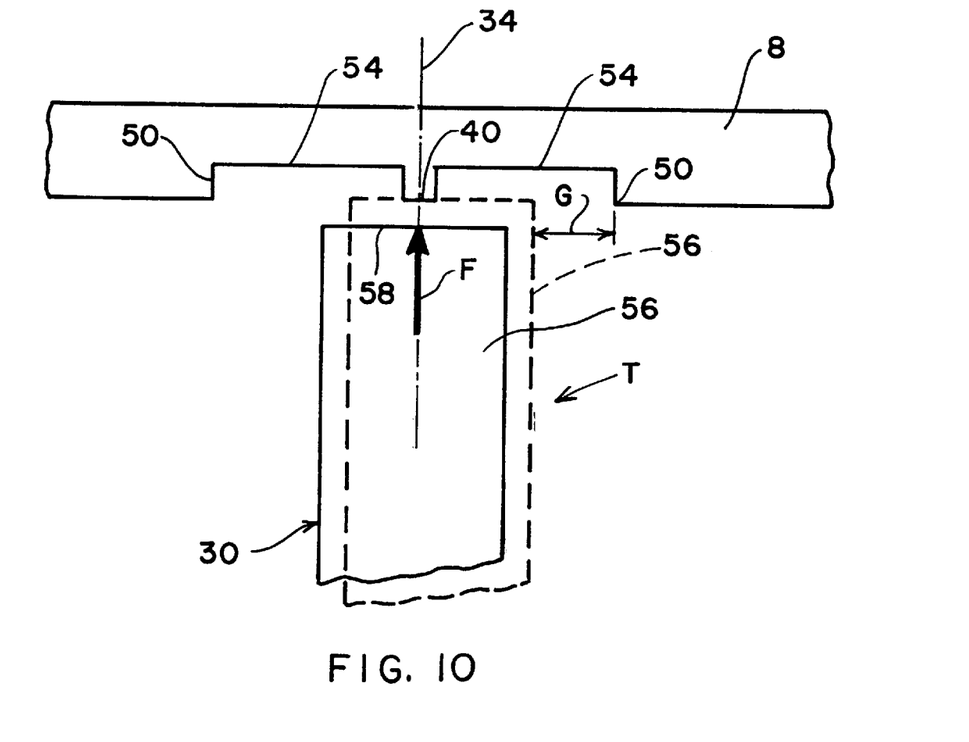
FIG. 10 is an enlarged schematic view of the mechanism of the invention operating on the suspension of FIG. 8.

As made clear by the illustrations, the critical concept of the invention is that it is possible to impart a force exactly through the longitudinal axis 24, as desired to avoid introducing distortions, even when the tool T (and therefore also the compressive face 58 of the tip 56) is not exactly aligned. Perfect alignment is ensured so long as the compressive face 58 of the tooling tip 56 is positioned under the post 40 such that the only points of contact are between the post and the face (that is, the entire face is placed within the zone of the cavity 54). Therefore, care must be taken to size the etched area 54 and, correspondingly, the flat compressive face 58 so as to always have a gap G between the face and the edges 50 of the etched area 54 during the testing operation. Otherwise, the two will bind and prevent the face 58 from freely contacting the post 40 in perfect alignment with the longitudinal axis 24.

Figure 9:
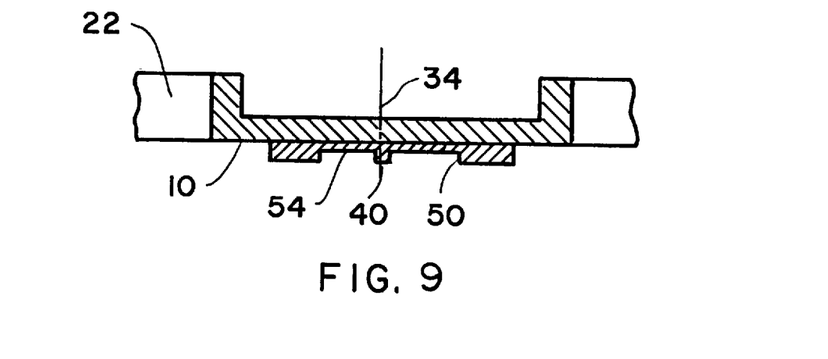
FIG. 9 is a partial cross-section of FIG. 8 taken along line 9—9 in FIGS. 8 and 11.

Note that, with specific reference to a suspension-assembly application, the schematic drawings of FIGS. 8–10 illustrate the operating principle of the invention in yielding perfect alignment between the force F exerted by the tool T and the longitudinal axis 24 of the suspension 11 by providing a post 40 etched in the gimbal 8, but the same coupling mechanism can be implemented in equivalent fashion between the tool T and a post 40 protruding from the load beam 10 of the suspension 11. The same operative principles ensure perfect alignment of the force exerted by the tip 56 of the testing tool with the longitudinal axis 24 of the suspension, so long as the size and other physical characteristics disclosed above are maintained.

Similarly, the post 40 is shown in the figures as having a finite flat surface at its end, which is consistent with the type of structure obtained by chemical etching, the preferred method for forming the post on thin metal sheet. The post may be cylindrical with a flat tip or may have a substantially semi-spherical end, such as to provide a constant radius tip. Obviously, the ideal structure of the post of the invention would end with a single point, so that no lateral moment could be imparted to the gimbal 8 even when the compressive face 58 is not perfectly parallel to the suspension.

Figure 11:
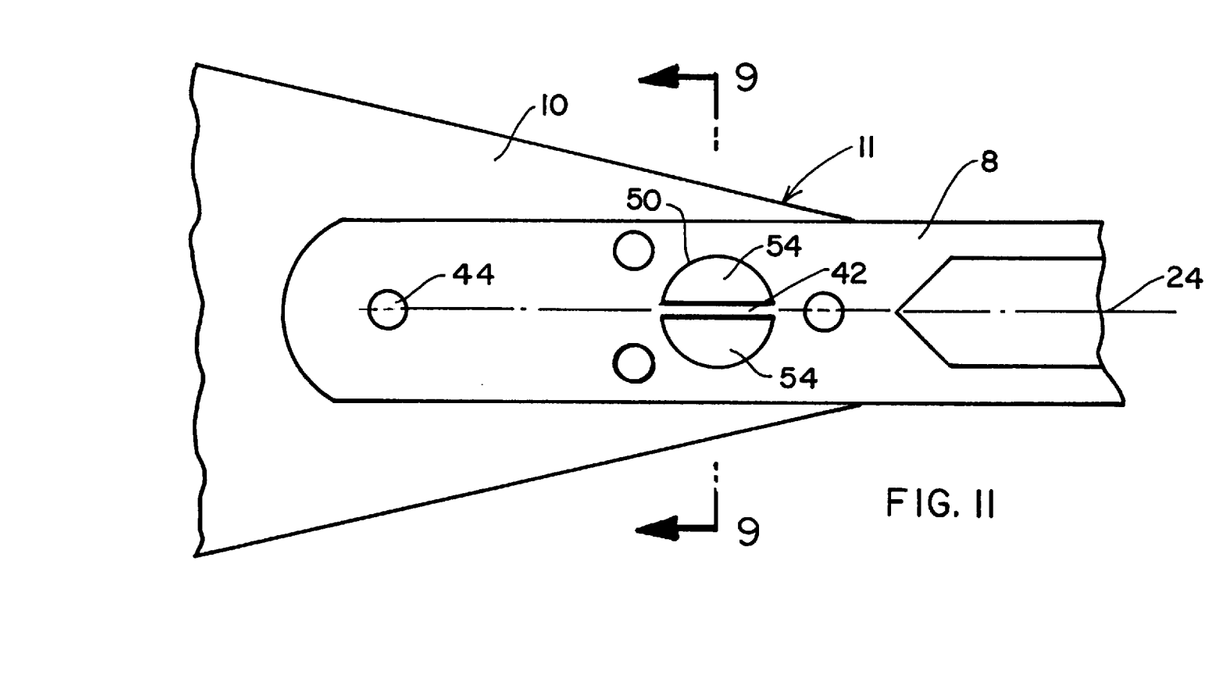
FIG. 11 is a bottom view of a portion of a conventional disk-drive suspension incorporating the support structure of the present invention in the form of a ridge etched in relief in the underside of the gimbal.

In another embodiment of the invention shown in FIG. 11, the post 40 is replaced by a longitudinal ridge 42 formed by etching two cavities 54 around the axis 24 of the gimbal 8 and suspension 11. Thus, all points of contact between the compressive face 58 of the test tool and the gimbal 8 during testing necessarily lie along the edge at the tip of the ridge 42 in alignment with the longitudinal axis 24. Therefore, perfect alignment of the line of action of the force F with the longitudinal axis 24 is still assured.

If the initial positioning of the suspension 11 during testing is slightly off (that is, if the centerline of the tip 56 is shifted and does not pass through the center of the post 40 (or ridge 42), as illustrated in the case seen in phantom line in FIG. 10), engagement of the post by the flat compressive face 58 will cause the force F to be transmitted to the suspension through the post in alignment with the longitudinal axis 24 of the suspension. Thus, perfect alignment is guaranteed so long as the initial placement of the tip 56 is within the concave cavity 54 surrounding the post 40.

Figure 12:
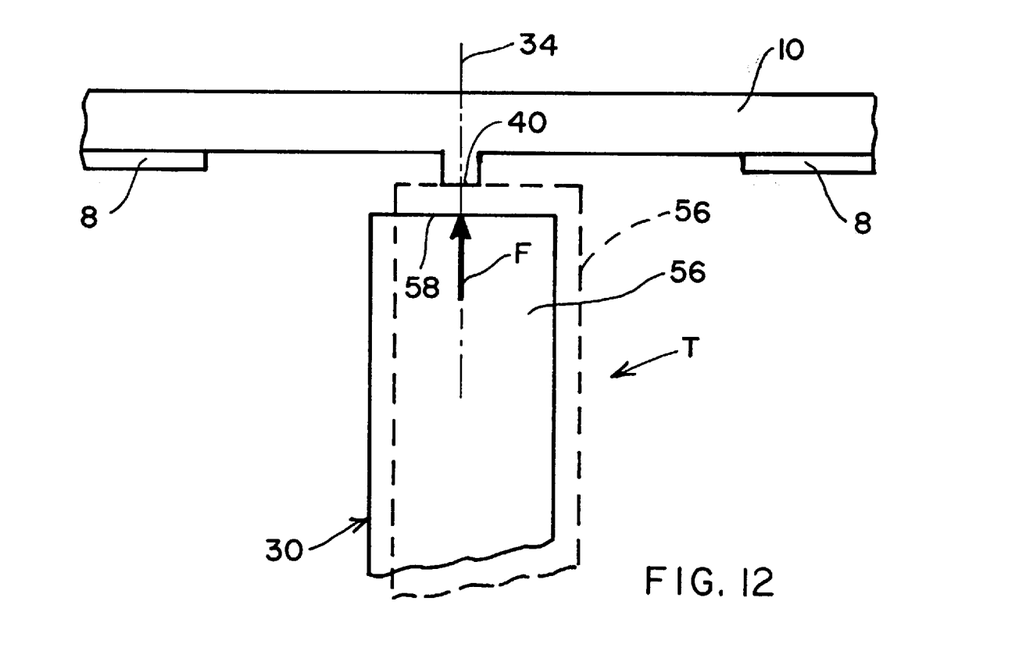
FIG. 12 is an illustration of another embodiment of the invention wherein a central-axis support ridge having a rectangular cross-section is created in a suspension.
Figure 13:
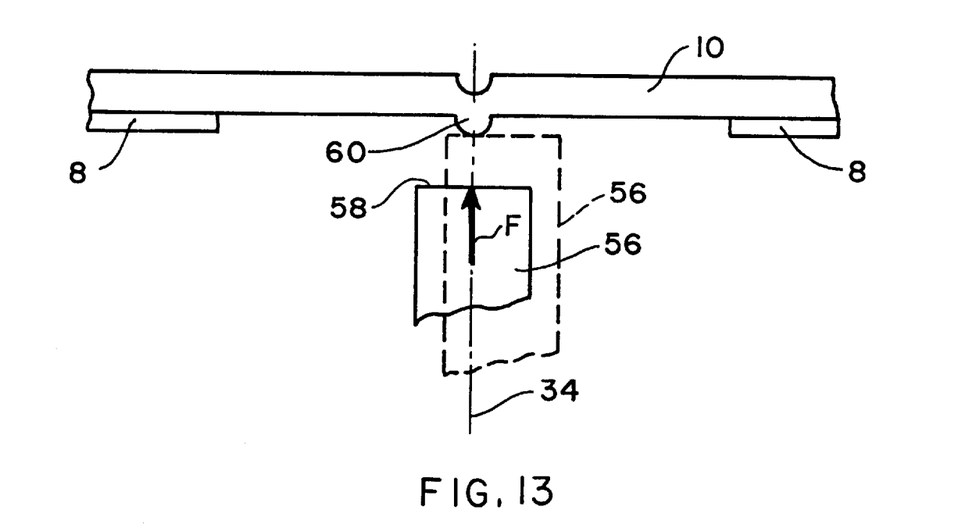
FIG. 13 is an illustration of yet another embodiment of the invention wherein a central-axis support ridge having a spherical-radius cross-section is created in a suspension.

For the suspension-assembly application described herein, a post having a tip approximately 0.05 mm wide across the longitudinal axis of the unit (or, correspondingly, a longitudinal ridge 42 having the same transverse edge width), an etched, concave cavity about 0.5 mm in diameter and substantially about 0.015 mm deep, and a test tool tip with a compressive face about 0.35 mm in diameter were found to be adequate to meet the positioning tolerances of standard testing equipment for suspension assemblies. In general, any set of sizes proportional to the ones described will yield a coupling device capable of aligning two structures for transmitting a force substantially exactly through a predetermined line of action. Obviously, all components must be manufactured with extreme precision in all cases. It is also noted that the cavities 54 are illustrated as annular and semi-annular (corresponding to circular and semicircular outer edges) in FIGS. 8 and 11, but could equivalently assume different shapes so long as a sufficiently large area around the post 40 (or ridge 42) is etched to project the post (or ridge) in relief from the bottom of the cavity. Similarly, the concept of the invention could be implemented in equivalent fashion by eliminating the cavity 54 in the suspension and procuring instead a post 40 or ridge 42 or semi-spherical protrusion 60 extending outwardly from a flat surface, as illustrated in FIGS. 12 and 13 for a post and protrusion, respectively, projecting directly from the structure of the load beam 10.

Various changes in the details, steps and components that have been described may be made by those skilled in the art within the principles and scope of the invention herein illustrated and defined in the appended claims. Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

I claim:

1. In a system wherein a first structure is used to exert a compressive force against a second structure along a predetermined alignment axis substantially normal to the second structure, a coupling device for ensuring that the compressive force is exerted precisely along said alignment axis, said coupling device comprising:

(a) a tip projecting from said first structure toward said second structure and adapted to exert a compressive force in a direction coincident with said predetermined alignment axis, said tip having a flat compressive face substantially normal to said predetermined alignment axis; and (b) a support member projecting from said second structure toward said flat compressive face, said support member having a main axis coaxial with said predetermined alignment axis and having a distal end in contact with the flat compressive face when said compressive force is exerted;
  wherein said support member consists of a post surrounded by a cavity formed in said second structure, said cavity having a surface larger than said flat compressive face.

2. The device recited in claim 1, wherein said second structure is a disk-drive suspension and said first structure is an instrument for imparting a test load to said disk-drive suspension.

3. In a system wherein a first structure is used to exert a compressive force against a second structure along a predetermined alignment axis substantially normal to the second structure, a coupling method for ensuring that the compressive force is exerted precisely along said alignment axis, said coupling method comprising the following steps:

(a) providing a tip projecting from said first structure toward said second structure and adapting said tip to exert a compressive force in a direction coincident with said predetermined alignment axis, said tip having a flat compressive face substantially normal to said predetermined alignment axis;

(b) providing a support member projecting from said second structure toward said flat compressive face, said support member having a main axis coaxial with said predetermined alignment axis and having a distal end in contact with the flat compressive face when said compressive force is exerted; and (c) moving said tip in a direction coincident with said predetermined alignment axis and causing said compressive face to contact said support member, thereby imparting a force along said predetermined alignment axis:
  wherein said support member consists of a post surrounded by a cavity formed in said second structure, said cavity having a surface larger than said flat compressive face.

4. The device recited in claim 2, wherein said support member consists of a post surrounded by a cavity formed in said disk-drive suspension, said cavity having a surface larger than said flat compressive face.

5. The device recited in claim 4, wherein said cavity is formed by chemical etching.

6. The device recited in claim 4, wherein said cavity is annular and has a diameter of about 0.50 mm, and said post is cylindrical and has a diameter of approximately 0.05 mm.

7. The device recited in claim 1, wherein said support member consists of a ridge surrounded by two cavities formed in said second structure, said cavities having a combined surface larger than said flat compressive face.

8. The device recited in claim 2, wherein said support member consists of a ridge surrounded by two cavities formed in said disk-drive suspension, said cavities having a combined surface larger than said flat compressive face.

9. The device recited in claim 8, wherein said two cavities are formed by chemical etching.

10. The device recited in claim 2, wherein said support member consists of a substantially semi-spherical protrusion formed in said disk-drive suspension, said protrusion being surrounded by a cavity formed in the suspension, and said cavity having a surface larger than said flat compressive face.

11. The device recited in claim 10, wherein said cavity is formed by chemical etching.

12. The device recited in claim 10, wherein said cavity is annular and has a diameter of about 0.50 mm and said semi-spherical protrusion has a diameter of about 0.05 mm.

13. The method recited in claim 3, wherein said second structure is a disk-drive suspension and said first structure is an instrument for imparting a test load to said disk-drive suspension.

14. The method recited in claim 13 wherein said support member consists of a post surrounded by a cavity formed in said disk-drive suspension, said cavity having a surface larger than said flat compressive face.

15. The method recited in claim 14, wherein said cavity is formed by chemical etching.

16. The method recited in claim 14, wherein said cavity is annular and has a diameter of about 0.50 mm, and said post is substantially cylindrical and has a diameter of approximately 0.05 mm.

17. The method recited in claim 3, wherein said support member consists of a ridge surrounded by two cavities formed in said second structure, said cavities having a combined surface larger than said flat compressive face.

18. The method recited in claim 13, wherein said support member consists of a ridge surrounded by two cavities formed in said disk-drive suspension, said cavities having a combined surface larger than said flat compressive face.

19. The method recited in claim 18, wherein said two cavities are formed by chemical etching.

20. The method recited in claim 19, wherein each of said two cavities is semi-annular and has a radius of about 0.25 mm, and said ridge has a width of approximately 0.05 mm.

21. The method recited in claim 13, wherein said support member consists of a substantially semi-spherical protrusion formed in said disk-drive suspension, said protrusion being surrounded by a cavity formed in the suspension, and said cavity having a surface larger than said flat compressive face.

22. The method recited in claim 21, wherein said cavity is formed by chemical etching.

23. The method recited in claim 21, wherein said cavity is annular and has a diameter of about 0.50 mm and said semi-spherical protrusion has a diameter of about 0.05 mm.

* * * * *